United States Patent
Peplinski et al.

(10) Patent No.: US 9,257,832 B2
(45) Date of Patent: Feb. 9, 2016

(54) RESETTABLE CIRCUIT PROTECTION SYSTEM AND VEHICLE WITH SAME

(71) Applicant: GM GLOBAL TECHNOLOGY OPERATIONS LLC, Detroit, MI (US)

(72) Inventors: Joseph T. Peplinski, Rochester Hills, MI (US); Jeffrey J. Hoorn, Northville, MI (US); Donald R. Seyerle, Grand Blanc, MI (US); Wade G. Johnson, Oxford, MI (US); Craig Atiyeh, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 153 days.

(21) Appl. No.: 14/011,265

(22) Filed: Aug. 27, 2013

(65) Prior Publication Data

US 2015/0062765 A1   Mar. 5, 2015

(51) Int. Cl.
*H02H 3/06* (2006.01)
*H02H 5/04* (2006.01)

(52) U.S. Cl.
CPC ............... *H02H 5/042* (2013.01); *H02H 3/06* (2013.01); *H02H 5/047* (2013.01)

(58) Field of Classification Search
CPC .............. H01L 21/6833; H01L 21/68757; H01M 2220/20; H01M 10/4257; H01M 2/1072; B60R 16/03; H02J 2007/0098
USPC ................................. 361/93, 59, 60
See application file for complete search history.

(56) References Cited

U.S. PATENT DOCUMENTS

| | | | | |
|---|---|---|---|---|
| 4,248,494 A * | 2/1981 | McDonald et al. | ........... | 439/638 |
| 5,007,863 A * | 4/1991 | Xuan | ............... | 439/639 |
| 5,766,020 A * | 6/1998 | Hughes | ........... | 439/35 |
| 5,993,262 A * | 11/1999 | Kowdynski et al. | ......... | 439/638 |
| 6,051,814 A * | 4/2000 | El-Haj | ........... | 219/264 |
| 6,075,340 A * | 6/2000 | Koenck | ............ | H02J 9/061 320/112 |
| 6,147,850 A * | 11/2000 | Gronowicz et al. | ........... | 361/103 |
| 2008/0204953 A1* | 8/2008 | Shuey | ............ | G01R 11/25 361/60 |
| 2010/0237705 A1* | 9/2010 | Klamm | ........... | H02J 1/10 307/87 |
| 2012/0173033 A1* | 7/2012 | Tischer | ............ | H02J 3/14 700/295 |
| 2013/0128402 A1* | 5/2013 | Otomo | ............ | H02H 3/066 361/59 |
| 2013/0134933 A1* | 5/2013 | Drew | ............ | H02H 5/04 320/109 |

* cited by examiner

*Primary Examiner* — Thienvu Tran
*Assistant Examiner* — Angela Brooks
(74) *Attorney, Agent, or Firm* — Cantor Colburn LLP

(57) ABSTRACT

A resettable circuit protection system for a vehicle includes a power outlet, a resettable circuit protection device, a resettable switch, a control module, and a user interface. The resettable circuit protection device is disposed in power communication with the power outlet, is operable between open and closed positions, and is configured to automatically open in response to an electrical overload condition at the power outlet. The resettable switch is electrically disposed in series with the circuit protection device, and operates between open and closed positions. The control module is disposed in signal communication with the circuit protection device and the switch. The user interface is disposed in signal communication with the control module. When the circuit protection device is open, the control module is responsive to facilitate display of a message at the user interface indicative of the circuit protection device being open, and to facilitate opening of the switch.

15 Claims, 3 Drawing Sheets

RESETTABLE CIRCUIT PROTECTION SYSTEM AND VEHICLE WITH SAME

FIELD OF THE INVENTION

The subject invention relates to a resettable circuit protection system for a vehicle.

BACKGROUND

An electrical circuit protection system for a cigarette lighter, cigar lighter or any other power outlet receptacle in a vehicle often includes fuses and sometimes includes circuit breakers. In a fuse system, a blown fuse must be replaced once it fuses due to an overload or short circuit condition. In a Type-II circuit breaker system, the circuit breaker may be configured to remain off after tripping until power is removed, and then reset itself when power is turned back on, regardless of whether the underlying fault condition has been remedied or not. Also, fuses and circuit breakers are often located in a place in the vehicle that is not easily accessible, particularly by an operator of the vehicle while driving. Accordingly, it is desirable to provide a resettable circuit protection system for a vehicle that overcomes these drawbacks.

SUMMARY OF THE INVENTION

An exemplary embodiment of the invention includes a resettable circuit protection system for a vehicle. The system includes a power outlet receptacle, a resettable circuit protection device, a resettable switch, a control module, and a user interface. The resettable circuit protection device is disposed in power communication with the power outlet receptacle, is operable between open and closed positions, and is configured to automatically open in response to an electrical overload condition at the power outlet receptacle. The resettable switch is electrically disposed in series with the circuit protection device, and is operable between open and closed positions. The control module is disposed in signal communication with the circuit protection device and with the switch. The user interface is disposed in signal communication with the control module. When the circuit protection device is open, the control module is responsive to facilitate display of a message at the user interface indicative of the circuit protection device being open, and to facilitate opening of the switch.

Another exemplary embodiment of the invention includes a method for operating a resettable circuit protection system for a vehicle. The method includes: sensing a condition where a resettable circuit protection device is open; displaying a message at a user interface indicative of the circuit protection device being open; opening a resettable switch that is electrically disposed in series with the circuit protection device; automatically closing the circuit protection device after a period of time has elapsed following the sensing a condition where the resettable circuit protection device is open; receiving at the user interface a command to close the resettable switch; and closing the resettable switch in response to the command.

Yet another embodiment of the invention includes a vehicle having a chassis and a resettable circuit protection system operably supported by the chassis. The resettable circuit protection system includes a power outlet receptacle, a resettable circuit protection device, a resettable switch, a control module, and a user interface. The resettable circuit protection device is disposed in power communication with the power outlet receptacle, is operable between open and closed positions, and is configured to automatically open in response to an electrical overload condition at the power outlet receptacle. The resettable switch is electrically disposed in series with the circuit protection device, and is operable between open and closed positions. The control module is disposed in signal communication with the circuit protection device and with the switch. The user interface is disposed in signal communication with the control module. When the circuit protection device is open, the control module is responsive to facilitate display of a message at the user interface indicative of the circuit protection device being open, and to facilitate opening of the switch.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
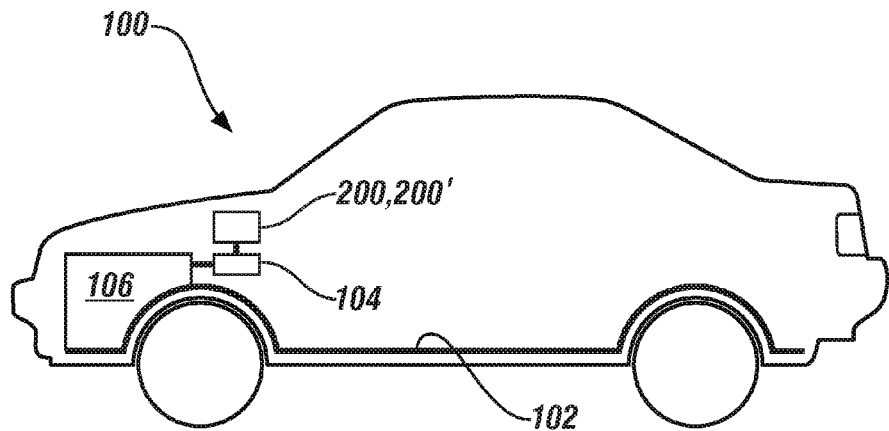
FIG. 1 depicts a vehicle for use in accordance with an embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, and with reference to FIG. 1, a vehicle 100 is equipped with a resettable circuit protection system (CPS) 200, 200' that is operably supported by a chassis 102 of the vehicle 100. As used herein, the term vehicle is not limited to an automobile, truck, van or sport utility vehicle, but includes any self-propelled or towed conveyance suitable for transporting a burden on land.

Figure 2:
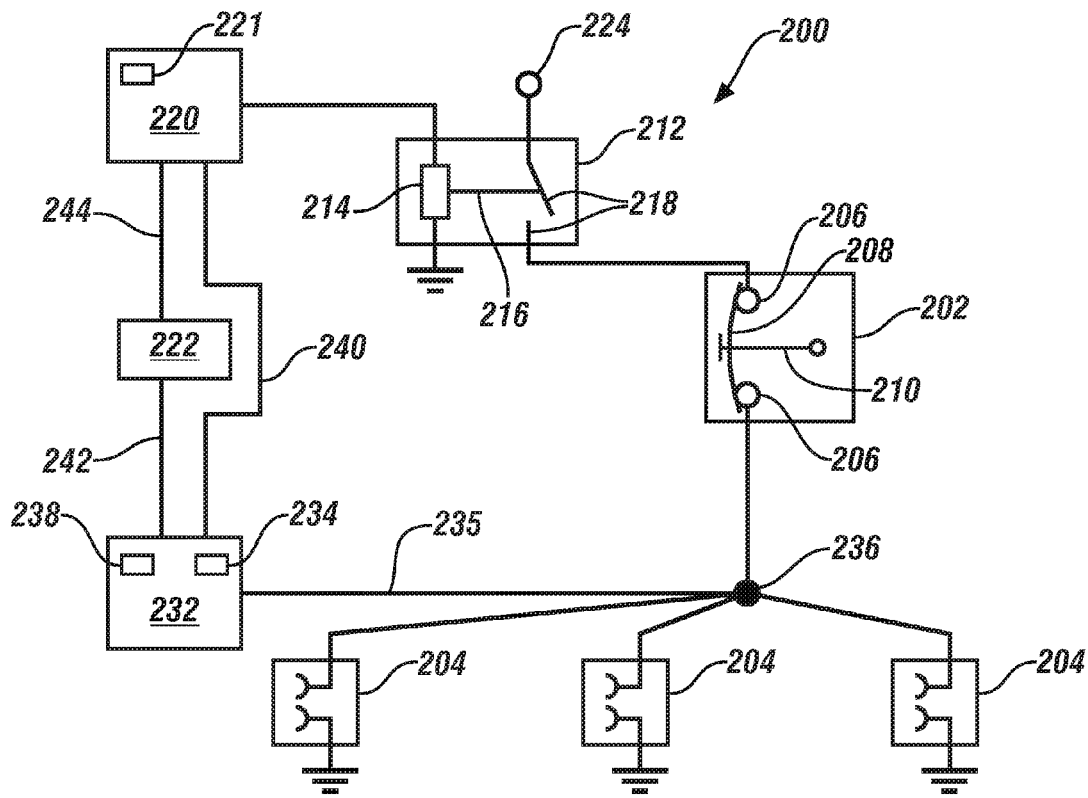
FIG. 2 depicts a resettable circuit protection system in accordance with an embodiment of the invention.

With reference to FIG. 2, the CPS 200 includes a resettable circuit protection device (CPD) 202 disposed in power communication with one or more power outlet receptacles 204 that are configured to provide power for a cigarette or cigar lighter, an auxiliary outlet, a cargo hold, or any other power outlet receptacle usable in the vehicle 100. In an embodiment, the power outlet receptacles 204 are 12 Vdc receptacles, but may be any other voltage suitable for a purpose disclosed herein. While FIG. 2 depicts three power outlet receptacles 204, it will be appreciated that less or more than three may be employed without detracting from the scope of the invention disclosed herein. The CPD 202 is operable between open and closed positions and is configured to automatically open in response to an electrical overload condition at one of the power outlet receptacles 204. In an embodiment, the CPD 202 is a circuit breaker having electrical contacts 206, a bimetal current sensing unit 208, and a contact pressure adjuster 210. Under an electrical overload condition, the excessive current through the bimetal current sensing unit 208 heats the bimetal to a point where it bends in opposition to the contact pressure provided by the contact pressure adjuster 210 to open the electrical contacts 206. The CPD 202 may be a type-1 circuit breaker (automatically opens and automatically closes), a type-2 circuit breaker (automatically opens and stays open until the overload condition is resolved), or a type-3 circuit breaker (automatically opens but requires manual re-closure). In an embodiment, the CPD 202 is a type-1 circuit breaker; however, it will be appreciated that other circuit breaker types may be employed as well.

Figure 3:
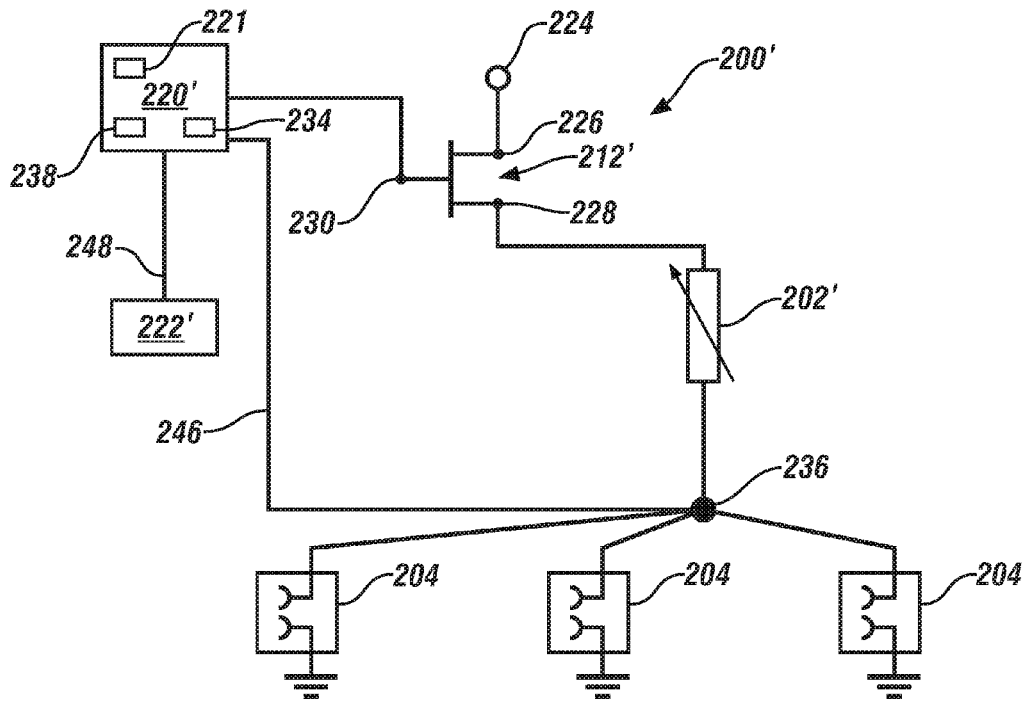
FIG. 3 depicts another resettable circuit protection system alternative to that of FIG. 2, in accordance with an embodiment of the invention.

In an alternative embodiment, and with reference briefly to FIG. 3 depicting an alternative CPS 200', the CPD 202 may be a positive temperature coefficient resistive (PTCR) device 202', such as a polymeric PTCR device having a conductive cool state and a substantially non-conductive heated state, or a PTCR thermistor, for example.

With reference back to FIG. 2, the CPS 200 further includes a resettable switch 212 that is electrically disposed in series with the CPD 202. In an embodiment, the switch 212 is an electromechanical relay having an electromagnet 214 disposed in operable communication with a movable armature 216, which is disposed in operable communication with electrical contacts 218. A control module 220 includes a processing circuit 221 that is responsive to executable instructions which when executed by the processing circuit 221 is operative to electrically energize and de-energize the electromagnet 214 to facilitate movement of the armature 216 between a first position and a second position to facilitate movement of the electrical contacts 218 between the open and closed positions. The control module 220 is also disposed in signal communication with a driver interface unit 222, more generally herein referred to as a user interface 222. In an embodiment, the user interface 222 is a human-machine interface accessible by an operator of the vehicle 100 that provides information to the operator and accepts operational commands provided by the operator, which will be discussed in more detail below. Power to the switch 212 is provided by a battery 224.

In an alternative embodiment, and with reference briefly to FIG. 3, the switch 212 may be a three-terminal electronic switching device 212', such as a field effect transistor (FET) for example, where the power from the battery 224 is connected to the source terminal 226, power to the CPD 202, 202' is provided by the drain terminal 228, and the control module 220' is disposed in signal communication with the gate terminal 230. In a manner similar to that of the embodiment of FIG. 2, the control signal from the control module 220' to the gate terminal 230 of the FET 212' controls the conductive state of the FET 212' consistent with an embodiment of the invention disclosed herein and discussed further below.

In another alternative embodiment, the resettable switch 212 may be a latching relay (herein referred to by reference numeral 212). With a latching relay 212 the control module 220 would energize one circuit to open the latching relay 212 and would energize a second circuit to close the latching relay 212. The benefit of a two-circuit approach is that no electrical power would be exerted to hold the latching relay 212 in either an open or closed state.

With reference back to FIG. 2, an embodiment includes a second control module 232 that is disposed in signal communication with the CPD 202 in such a manner as to enable the second control module 232 to determine whether the CPD 202 is open or closed. In an embodiment, the second control module 232 includes a voltage sensor 234 that senses a voltage at a reference node 236 via signal path 235. The second control module 232 may be configured to sense a high discrete input, such as a relatively high voltage or a relatively low or non-existent voltage at reference node 236, or may be configured to sense an analog voltage at reference node 236. As used herein, the term high discrete input means that the input is looking to detect an externally applied connection to voltage or lack thereof, and while it may be possible to use a low discrete input in place of a high discrete input, there may be some loss of functionality when implementing a low discrete input protocol. Under either sensing arrangement, the second control module 232 includes a processing circuit 238 that is responsive to executable instructions which, when executed by the processing circuit 238, facilitates a determination of whether the CPD 202 is open or closed, and if open sends a command signal to control module 220 via signal path 240 to facilitate opening of the switch 212. As such, the second control module 232 is viewed as being in indirect signal communication with the switch 212 via control module 220. In the embodiment depicted in FIG. 2, the second control module 232 is also disposed in signal communication with the user interface 222 via signal path 242, thereby enabling the user interface 222 to display a message readable by the operator of the vehicle 100 where the message is indicative of the CPD 202 being open in response to an electrical overload condition in the electrical path feeding the power outlet receptacles 204. The user interface 222 is disposed in signal communication with control module 220 via signal path 244. Upon receiving a message at the user interface 222 that the CPD 202 is open, the operator of the vehicle 100, upon ascertaining and correcting the cause of the overload, can send a command signal to control module 220 to close the switch 212 to restore power back to the power outlet receptacles 204.

With reference again to FIG. 3, an embodiment includes an arrangement where the functionality of the second control module 232, of FIG. 2, is incorporated into control module 220'. The voltage sensor 234 senses a voltage at the reference node 236 via signal path 246, and the user interface 222' is in signal communication with control module 220' via signal path 248. In the embodiment of FIG. 3, control module 220' sends the message indicative of the CPD 202, 202' being open to the user interface 222', and receives the command signal from the user interface 222' to close the switch 212, 212'.

In an embodiment, the user interface 222, 222' may be integrated with an audio visual display system or a messaging system of the vehicle 100, such as a navigation system or a driver information system for example, and may be configured to receive operator input via manipulation of control paddles, toggles, buttons, dials or any other suitable means preferably disposed in close proximity to the steering wheel of the vehicle 100 or otherwise accessible to the operator of the vehicle 100 while driving.

From the foregoing descriptions of FIGS. 2 and 3, it will be appreciated that the above-described switch may be an electromechanical relay 212 or a three-terminal electronic switching device 212', that the above-described CPD may be a circuit breaker 202 or a PTCR device 202', and that the functionality of the above-described second control module may be provided by a second control module 232 that is distinct from control module 220, or may be provided by a control module 220' having the functionality of both the control module 220 and the second control module 232. It will also be appreciated that an element depicted in FIG. 3 may be interchanged with the corresponding element in FIG. 2 without requiring that all of the corresponding elements be interchanged. That is, switch 212' from FIG. 3 may replace switch 212 in FIG. 2 and be used with CPD 202 in FIG. 2, for example.

While embodiments have been described herein using a circuit breaker 202 or a PTCR device 202' as a CPD, it will be appreciated that other CPD's suitable for a purpose disclosed herein, such as a shape memory alloy snap-acting link for example, may also be employed as a CPD without detracting from the scope of the invention. And while embodiments have been described herein using an electromechanical relay 212 or a three-terminal electronic switching device 212' as a switch, it will be appreciated that other switches suitable for a purpose disclosed herein, such as a contactor for example, may be employed without detracting from the scope of the invention.

From the foregoing, it will be appreciated that the CPD 202, 202' may be configured to automatically close after a period of time has elapsed, such as when a bimetal cools down for example, following an event where the CPD 202, 202' automatically opened, such as under an overload condition for example. It will also be appreciated that following a sequence of events where the CPD 202, 202' automatically opened, then the switch 212, 212' was caused to open, and then the CPD 202, 202' automatically closed, the control module 220, 220' is responsive to an input at the user interface 222, 222' to facilitate closing of the switch 212, 212' to restore power to the power outlet receptacles 204.

In an embodiment, the vehicle 100 further includes an ignition system 104 disposed in operable communication with an engine 106, best seen with reference to FIG. 1, where the ignition system 104 is operable between on and off states, and where the resettable switch 212, 212' is operable to automatically reset to the closed position in response to the ignition system 104 having cycled from on to off, and then from off to on. In an embodiment, control module 220, 220' may be configured to monitor a state of the ignition system 104, or may be configured to receive an input signal indicative of a state of the ignition system 104, and is configured to operate the switch 212, 212' in a manner previously described to facilitate the resetting and reclosing of the switch 212, 212'. In an embodiment, and in response to the resettable switch 212, 212' automatically resetting to the closed position in response to the ignition system 104 having cycled from on to off and then from off to on, the control module 220, 220' may be configured via executable instructions to facilitate display of an optional second message at the user interface 222, 222' indicative of the resettable switch 212, 212' having automatically reset to the closed position from an open position. By providing an optional second message that is different from the original message, a different operator of the vehicle 100 could be made aware of a prior existing condition, rather than simply being informed from the original message that the CPD 202, 202' is open, which may no longer be the case if the CPD 202, 202' automatically reset to the closed position in a manner described above.

In an alternative embodiment, the resettable switch 212, 212' may be operably configured to latch in the off position when opened, even when the ignition system 104 is cycled from on to off and then from off to on, thereby preventing restoration of power to the power outlet receptacles 204 until an operator of the vehicle 100 ascertains and clears the cause of the overload condition. Under these circumstances, the aforementioned second message may still be different from the original message, but may provide additional information relating to the opening of the switch 212, 212', such as the time and date of the activity for example.

Figure 4:
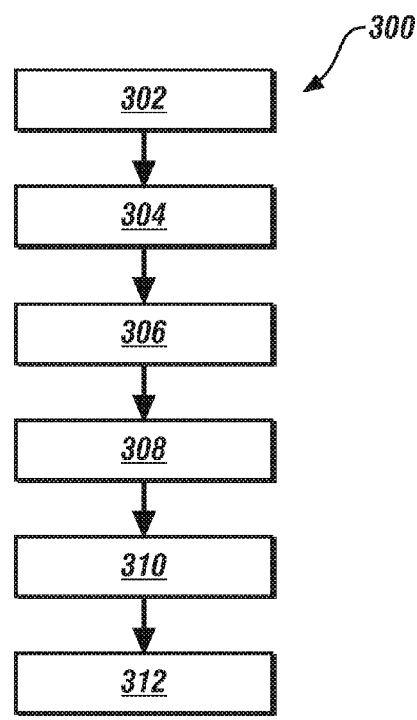
FIG. 4. depicts a method for operating a resettable circuit protection system in accordance with an embodiment of the invention.

From the foregoing description of structure associated with the CPS 200, 200', and with reference now to FIG. 4, it will be appreciated that an embodiment of the invention also includes a method 300 for operating a resettable CPS 200, 200'. At block 302, a control module 232 or 220' senses a condition where a resettable CPD 202, 202' is open. At block 304, a message indicative of the CPD 202, 202' being open is displayed at the user interface 222, 222'. At block 306, the resettable switch 212, 212' that is electrically disposed in series with the CPD 202, 202' is opened. At block 308, the CPD 202, 202' is automatically closed after a period of time has elapsed following the sensing step at block 302. At block 310, an operator of the vehicle 100 inputs a command that is received at the user interface 222, 222' to close the resettable switch 212, 212'. And at block 312, the resettable switch 212, 212' is closed in response to the command received at block 310.

While embodiments of the invention have been described with reference to a single resettable switch 212, 212' electrically connected in series with a single resettable CPD 202, 202', it will be appreciated that other circuit topologies may be employed without detracting from the scope of the invention. For example, a single resettable switch may be electrically connected in series with two resettable CPDs, where the two CPDs are electrically connected in parallel with each other. Or, a first resettable switch may be electrically connected in series with a first resettable CPD, and a second resettable switch may be electrically connected in series with a second resettable CPD, where both of the first and second switches, having unique machine-identifiable addresses, are controlled by the same control module 220, 220'.

Figure 5:
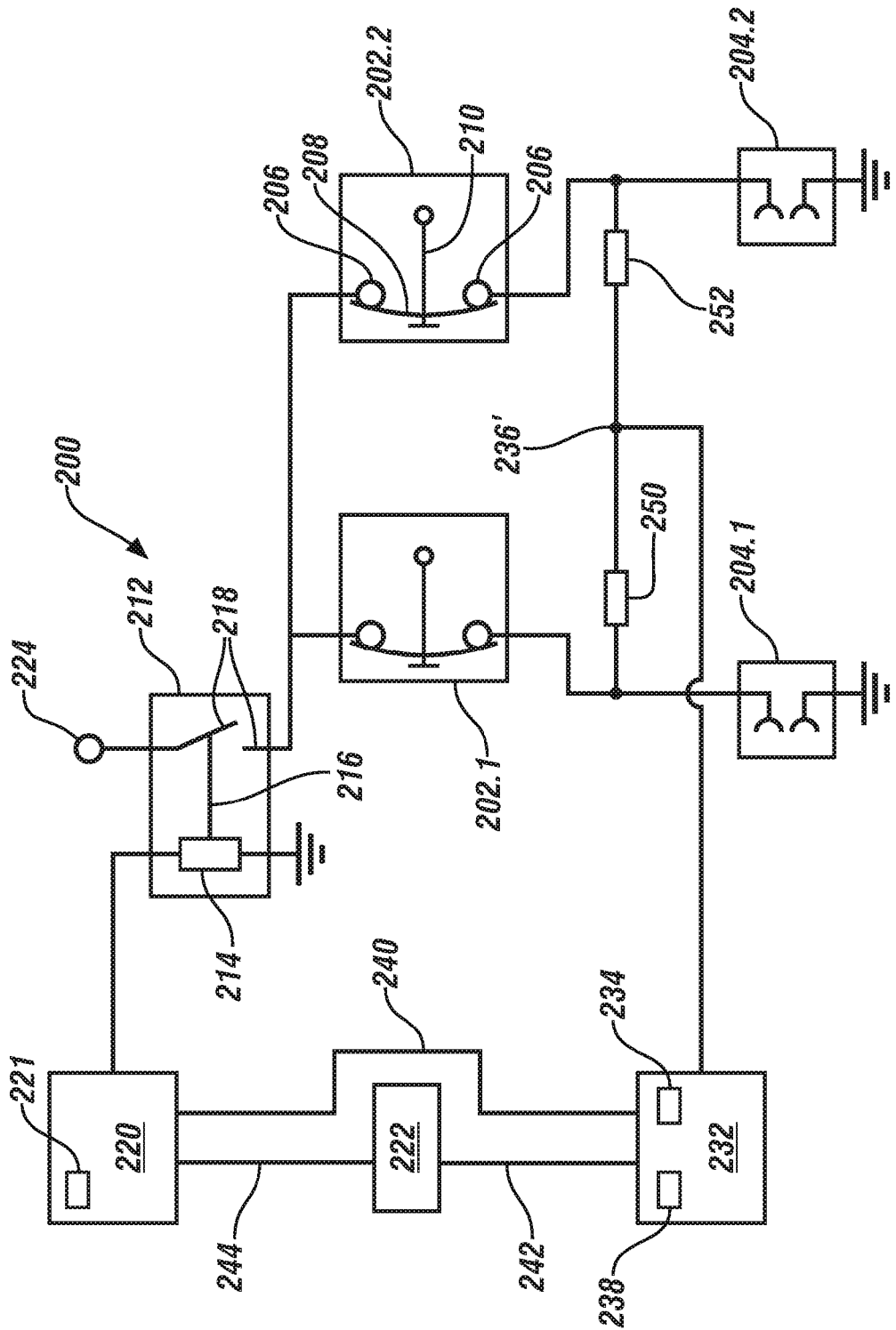
FIG. 5 depicts an alternative resettable circuit protection system in accordance with an embodiment of the invention.

Reference is now made to FIG. 5, which depicts a circuit topology similar to that of FIG. 2, but with a single resettable switch 212 electrically connected in series with two resettable CPDs 202.1, 202.2, where the two CPDs 202.1, 202.2 are electrically connected in parallel with each other. That is, the switch 212 is disposed to electrically feed power to both CPDs 202.1, 202.2. The first CPD 202.1 electrically feeds and protects a first power outlet receptacle 204.1, and the second CPD 202.2 electrical feeds and protects a second power outlet receptacle 204.2. In the embodiment of FIG. 5, the reference node 236' is located in a resistor ladder network having a first resistor 250 and a second resistor 252 with the reference node 236' disposed therebetween. The other side of each resistor 204.1, 204.2 is electrically connected to the output of the associated CPD 202.1, 202.2. The voltage sensor 234 of the control module 232 is disposed and configured to sense the voltage at the reference node 236'. The voltage V(236') at reference node 236' varies according to the following, assuming that the overloaded circuit still has a device connected to provide ground potential or the control module 232 has an internally grounded resistor (not shown).

When both CPDs 202.1, 202.2 are closed, the voltage V(236') is approximately equal to the voltage V(Bat) of the battery 224.

When one CPD 202.1 or 202.2 is closed and the other is open, V(236') is less than V(Bat) and greater than zero volts. If both resistors 204.1, 204.2 have the same resistance value, then V(236') will be approximately equal to 0.5*V(Bat).

When both CPDs 202.1, 202.2 are open, V(236') is approximately equal to zero volts.

While FIG. 5 is depicted with only two CPDs 202.1, 202.2 and two power outlet receptacles 204.1, 204.2, it will be appreciated that the same sensing circuit concept can be extended to three or more circuits, which is contemplated and considered to be within the scope of the invention.

While FIGS. 2, 3 and 5 depict a circuit topology having the following order of electrical connections: battery 224, then resettable switch 212, 212', then CPD 202, 202', then outlet receptacles 204, it will be appreciated that the resettable switch 212, 212' and the CPD 202, 202' may be interchanged to place the CPD 202, 202' electrically upstream of the resettable switch 212, 212'. All such topologies consistent with a purpose disclosed herein are contemplated and considered within the scope of the invention.

From the foregoing, it will be appreciated that some embodiments of the invention may include one or more of the following advantages: providing an operator-accessible resettable circuit protection strategy for power points in a vehicle; and, alerting an operator to a fault condition and providing the operator with a readily accessible means to re-establish power to a tripped electrical circuit while operating the vehicle.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A resettable circuit protection system for a vehicle, the system comprising:
   a power outlet receptacle;
   a resettable circuit protection device disposed in power communication with the power outlet receptacle, the circuit protection device operable between open and closed positions, the circuit protection device being configured to automatically open in response to an electrical overload condition at the power outlet receptacle;
   a resettable switch electrically disposed in series with the circuit protection device, the switch operable between open and closed positions;
   a control module disposed in signal communication with the circuit protection device and with the switch; and
   a user interface disposed in signal communication with the control module;
   wherein when the circuit protection device is open, the control module is responsive to facilitate display of a message at the user interface indicative of the circuit protection device being open, and to facilitate opening of the switch;
   wherein when the circuit protection device is closed and the switch is closed, the switch, the circuit protection device, and the power outlet are disposed such that an electrical current that passes through the switch also passes through the circuit protection device and is fed to the power outlet receptacle.

2. The system of claim 1, wherein the resettable circuit protection device comprises a thermally-activated circuit breaker or a positive temperature coefficient resistive device.

3. The system of claim 1, wherein the resettable switch comprises an electromechanical relay or a three-terminal electronic switching device.

4. The system of claim 1, wherein:
   the resettable switch comprises an electromagnet, a movable armature and electrical contacts, the movable armature being operable to move the electrical contacts between the open and closed positions; and
   the control module is operative to electrically energize and de-energize the electromagnet to facilitate movement of the armature between a first position and a second position to facilitate movement of the electrical contacts between the open and closed positions.

5. The system of claim 1, wherein the signal communication between the control module and the circuit protection device comprises a high discrete input signal or an analog signal.

6. The system of claim 1, wherein the circuit protection device is configured to automatically close after a period of time has elapsed following an event where the circuit protection device automatically opened, and wherein following a sequence of events where the circuit protection device automatically opened, then the switch opened, and then the circuit protection device automatically closed, the control module is responsive to an input at the user interface to facilitate closing of the switch.

7. The system of claim 3, wherein the three-terminal electronic switching device comprises a field effect transistor having a source terminal, a drain terminal and a gate terminal, and wherein the control module is disposed in signal communication with the gate terminal.

8. The system of claim 1, wherein the power outlet receptacle is one of a plurality of power outlet receptacles, and wherein when the circuit protection device is closed and the switch is closed, the switch, the circuit protection device, and the power outlet are disposed such that an electrical current that passes through the switch also passes through the circuit protection device and is fed to the plurality of power outlet receptacles.

9. The system of claim 1, wherein the vehicle comprises an ignition system operable between on and off states, and wherein the resettable switch is operable to automatically reset to the closed position in response to the ignition system having cycled from on to off, and then from off to on.

10. The system of claim 9, wherein in response to the resettable switch automatically resetting to the closed position in response to the ignition system having cycled from on to off and then from off to on, the control module is configured to facilitate display of a second message at the user interface indicative of the resettable switch having automatically reset to the closed position from an open position.

11. A resettable circuit protection system for a vehicle, the system comprising:
    a power outlet receptacle;
    a resettable circuit protection device disposed in power communication with the power outlet receptacle, the circuit protection device operable between open and closed positions, the circuit protection device being configured to automatically open in response to an electrical overload condition at the power outlet receptacle;
    a resettable switch electrically disposed in series with the circuit protection device, the switch operable between open and closed positions;
    a control module disposed in signal communication with the circuit protection device and with the switch;
    a user interface disposed in signal communication with the control module;
    wherein when the circuit protection device is open, the control module is responsive to facilitate display of a message at the user interface indicative of the circuit protection device being open, and to facilitate opening of the switch;
    wherein the power outlet receptacle is a first power outlet receptacle, the resettable circuit protection device is a first resettable circuit protection device in power communication with the first power outlet receptacle, and further comprising:
a second power outlet receptacle; and
a second resettable circuit protection device disposed in power communication with the second power outlet receptacle, the second circuit protection device operable between open and closed positions, the second circuit protection device being configured to automatically open in response to an electrical overload condition at the second power outlet receptacle;
wherein the resettable switch is disposed to electrically feed power to both the first and the second circuit protection devices, the switch operable between open and closed positions;
wherein the control module is disposed in signal communication with the first and second circuit protection devices via a resistor ladder network, and is disposed in signal communication with the switch;
wherein when one or more of the circuit protection devices is open, the control module is responsive to facilitate display of a message at the user interface indicative of the state of the one or more circuit protection devices being open, and to facilitate opening of the switch.

12. A method for operating a resettable circuit protection system for a vehicle having a power outlet receptacle, the method comprising:
sensing a condition where a resettable circuit protection device is open;
displaying a message at a user interface indicative of the circuit protection device being open;
opening a resettable switch that is electrically disposed in series with the circuit protection device;
automatically closing the circuit protection device after a period of time has elapsed following the sensing a condition where the resettable circuit protection device is open;
receiving at the user interface a command to close the resettable switch; and
closing the resettable switch in response to the command;
wherein when the circuit protection device is closed and the switch is closed, the switch, the circuit protection device, and the power outlet are disposed such that an electrical current that passes through the switch also passes through the circuit protection device and is fed to the power outlet receptacle.

13. The method of claim 12, wherein the resettable circuit protection system comprises:
a power outlet receptacle;
a resettable circuit protection device disposed in power communication with the power outlet receptacle, the circuit protection device operable between open and closed positions, the circuit protection device being configured to automatically open in response to an electrical overload condition at the power outlet receptacle;
a resettable switch electrically disposed in series with the circuit protection device, the switch operable between open and closed positions;
a control module disposed in signal communication with the circuit protection device and with the switch; and
a user interface disposed in signal communication with the control module;
wherein when the circuit protection device is open, the control module is responsive to facilitate display of a message at the user interface indicative of the circuit protection device being open, and to facilitate opening of the switch.

14. A vehicle, comprising:
a chassis;
a resettable circuit protection system operably supported by the chassis, the resettable circuit protection system comprising:
a power outlet receptacle;
a resettable circuit protection device disposed in power communication with the power outlet receptacle, the circuit protection device operable between open and closed positions, the circuit protection device being configured to automatically open in response to an electrical overload condition at the power outlet receptacle;
a resettable switch electrically disposed in series with the circuit protection device, the switch operable between open and closed positions;
a control module disposed in signal communication with the circuit protection device and with the switch; and
a user interface disposed in signal communication with the control module;
wherein when the circuit protection device is open, the control module is responsive to facilitate display of a message at the user interface indicative of the circuit protection device being open, and to facilitate opening of the switch;
wherein when the circuit protection device is closed and the switch is closed, the switch, the circuit protection device, and the power outlet are disposed such that an electrical current that passes through the switch also passes through the circuit protection device and is fed to the power outlet receptacle.

15. A resettable circuit protection system for a vehicle, the system comprising:
a power outlet receptacle;
a resettable circuit protection device disposed in power communication with the power outlet receptacle, the circuit protection device operable between open and closed positions, the circuit protection device being configured to automatically open in response to an electrical overload condition at the power outlet receptacle;
a resettable switch electrically disposed in series with the circuit protection device, the switch operable between open and closed positions;
a control module disposed in signal communication with the circuit protection device and with the switch; and
a user interface disposed in signal communication with the control module;
wherein when the circuit protection device is open, the control module is responsive to facilitate display of a message at the user interface indicative of the circuit protection device being open, and to facilitate opening of the switch;
wherein the resettable switch comprises a three-terminal electronic switching device that comprises a field effect transistor having a source terminal, a drain terminal and a gate terminal, and wherein the control module is disposed in signal communication with the gate terminal.

* * * * *